May 23, 1944.   J. O. HAMREN   2,349,265
TRACTOR WITH HYDRAULIC DRIVE
Filed April 19, 1941   6 Sheets-Sheet 1

INVENTOR
JOSEPH O. HAMREN
BY *Chas. C. Reif*
ATTORNEY

May 23, 1944.  J. O. HAMREN  2,349,265
TRACTOR WITH HYDRAULIC DRIVE
Filed April 19, 1941  6 Sheets-Sheet 2

INVENTOR
JOSEPH O. HAMREN
BY Chas. C. Reif
ATTORNEY

INVENTOR
JOSEPH O. HAMREN
BY Chas. C. Keif
ATTORNEY

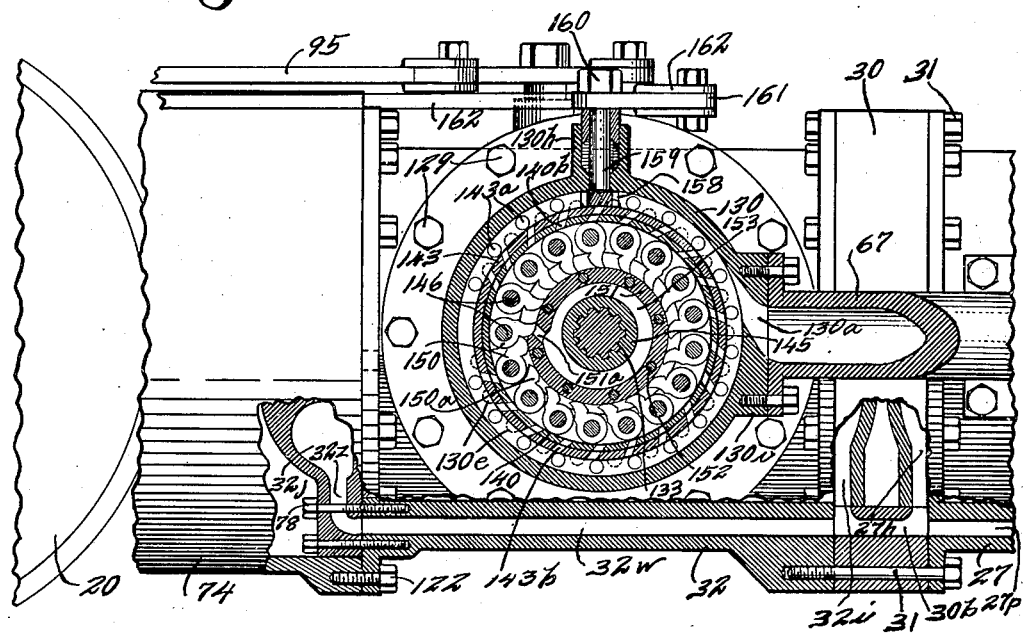

May 23, 1944.  J. O. HAMREN  2,349,265
TRACTOR WITH HYDRAULIC DRIVE
Filed April 19, 1941   6 Sheets-Sheet 6

INVENTOR.
JOSEPH O. HAMREN
BY Chas. E. Reif
ATTORNEY

Patented May 23, 1944

2,349,265

UNITED STATES PATENT OFFICE 2,349,265

TRACTOR WITH HYDRAULIC DRIVE

Joseph O. Hamren, Minneapolis, Minn.

Application April 19, 1941, Serial No. 389,379

18 Claims. (Cl. 180—66)

This invention relates to an automotive vehicle and while the invention is applicable to many types of automotive vehicles, it is particularly designed for and illustrated for use with a tractor.

It is an object of this invention to provide a tractor having a frame, driving wheels, an internal combustion motor mounted on said frame and a differential gearing for said wheels together with a fluid pump connected to said motor and a fluid operated motor driven by fluid under pressure from said pump and having a driving shaft connected to said differential gearing.

It is a further object of the invention to provide such tractor assembly as set forth in the preceding paragraph in which said pump is directly connected to said internal combustion motor and said fluid operated motor is disposed between said pump and said differential gearing.

It is also an object of the invention to provide such a traction assembly as set forth above, said pump having a driving shaft directly connected to said internal combustion motor, said fluid operated motor having a driving shaft, a casing between said pump and fluid operated motor having bearings therein for said shafts, said shafts being coaxial and a casting between said fluid operated motor and differential gearing having a bearing for said driving shaft of said fluid operated motor, a pinion being secured to said last mentioned driving shaft connected to and driving said differential gearing.

It is a further object of the invention to provide an automotive vehicle such as a tractor having a frame, an internal combustion motor mounted on said frame and driving wheels together with a pump connected to said motor, a fluid operated motor mounted on said frame driven by fluid under pressure from said pump and having a driving shaft connected to said differential gearing, a second fluid operated motor mounted on said frame and driven by fluid under pressure from said pump and a service pulley driven by said last mentioned fluid operated motor.

It is still another object of the invention to provide an assembly as set forth in the preceding paragraph together with means for driving either of said fluid operated motors at will and for driving said first mentioned fluid operated motor in either direction to give forward and rearward speeds.

Another object of the invention is to provide a structure and arrangement of fluid pump and fluid operated motor or transmission device which can be placed on tractors now in use or which can be readily placed on new tractors.

These and other objects and advantages of the invention will be fully set forth in the following description made in connection with the accompanying drawings in which like reference characters refer to similar parts throughout the several views and in which:

Fig. 5 is a view in vertical section taken substantially on line 5—5 of Fig. 7 as indicated by the arrows;

Fig. 6 is a vertical section taken substantially on line 6—6 of Fig. 7;

Fig. 10 is a partial plan view showing the modified arrangement of the device.

Figure 2:
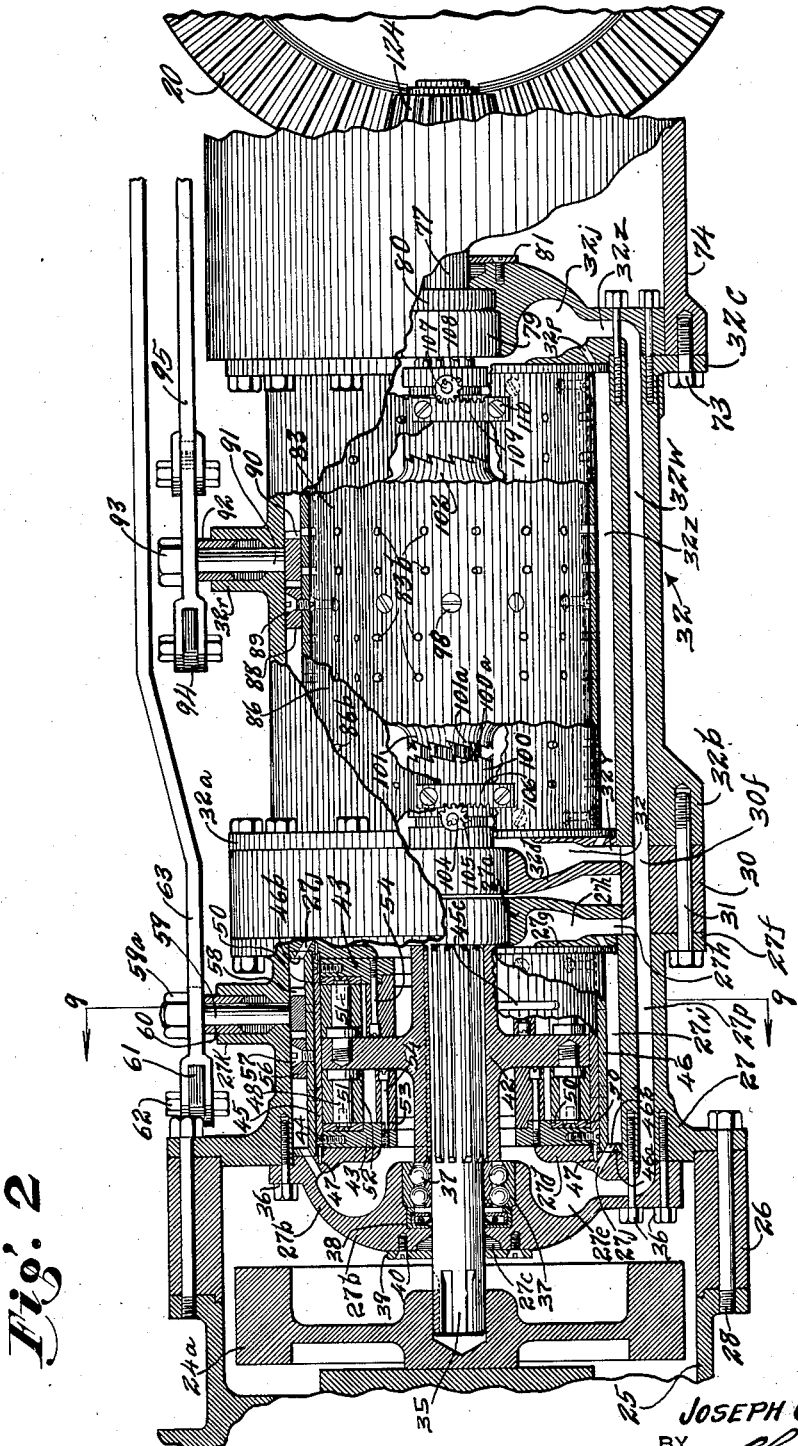
Fig. 2 is a view partly in side elevation and partly in vertical section of a portion of the device, some parts being broken away.
Figure 4:
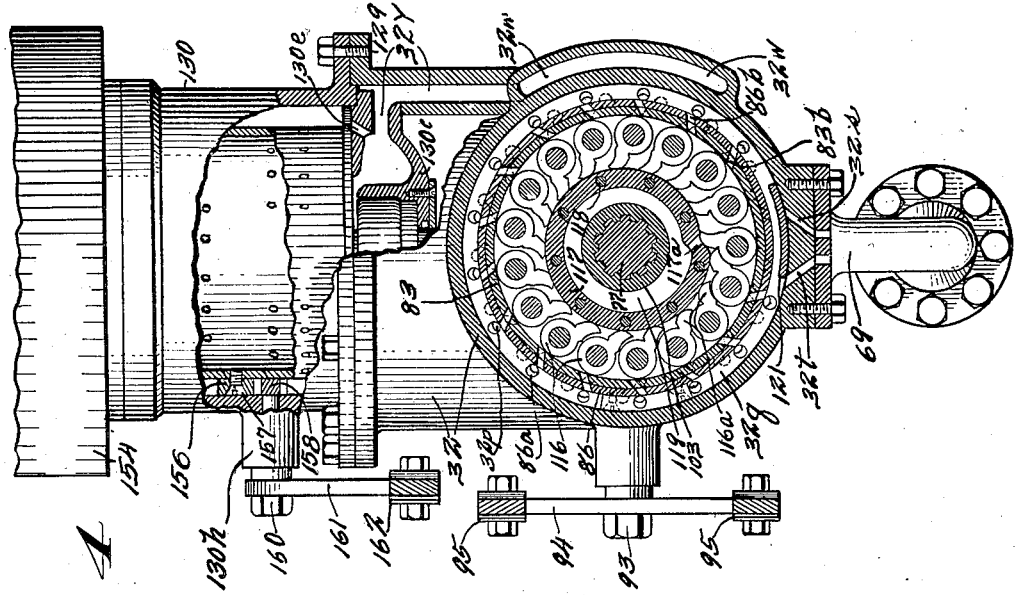
Fig. 4 is a vertical section taken substantially on line 4—4 of Fig. 7 as indicated by the arrows, some parts being broken away.
Figure 3:
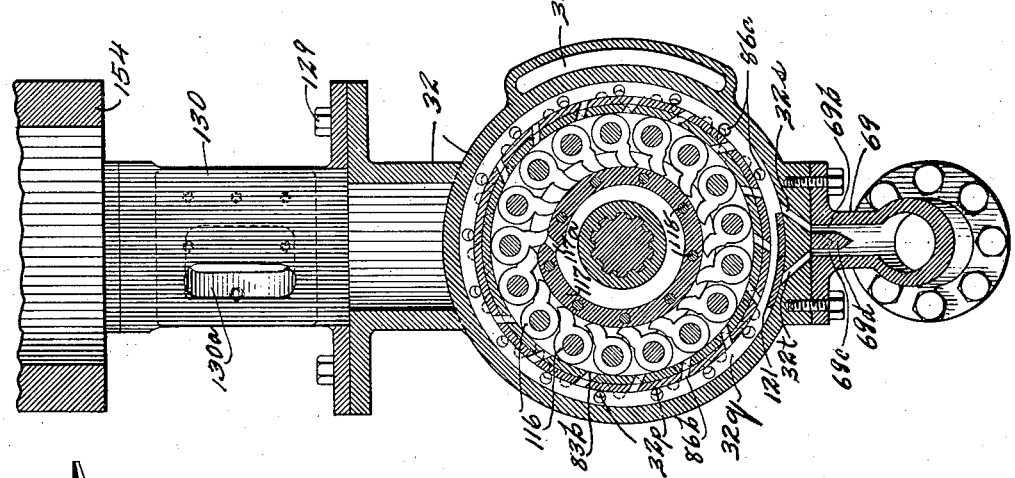
Fig. 3 is a vertical section taken substantially on line 3—3 of Fig. 7 as indicated by the arrows.
Figure 7:
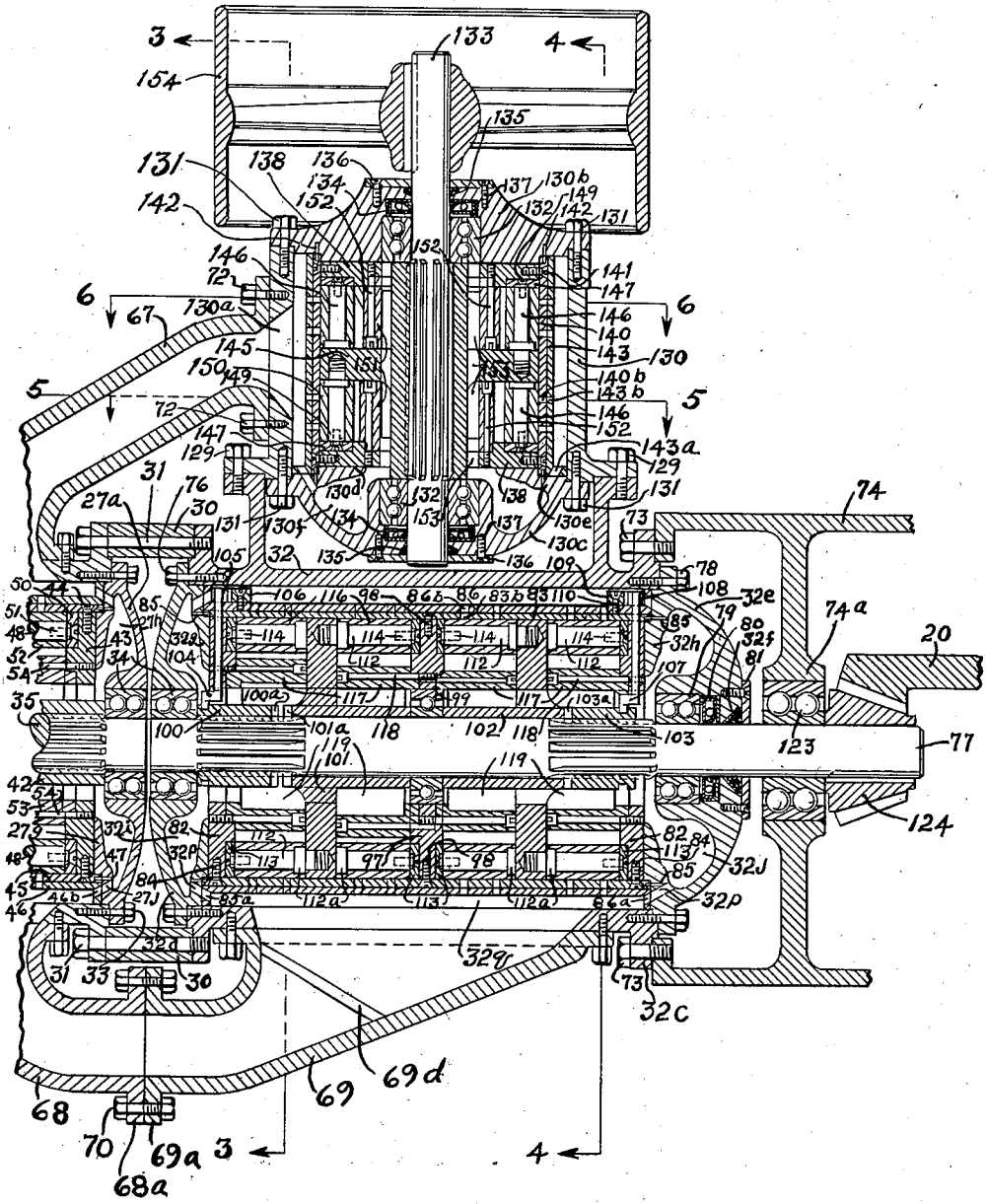
Fig. 7 is a partial horizontal section taken substantially through the axes of the driving shaft of the fluid operated motors.
Figure 8:
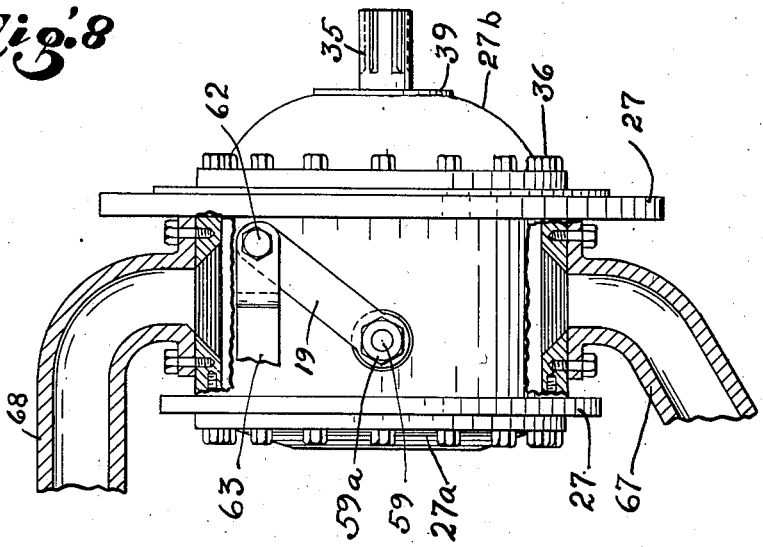
Fig. 8 is a partial view partly in side elevation and partly in vertical section of the pump.
Figure 9:
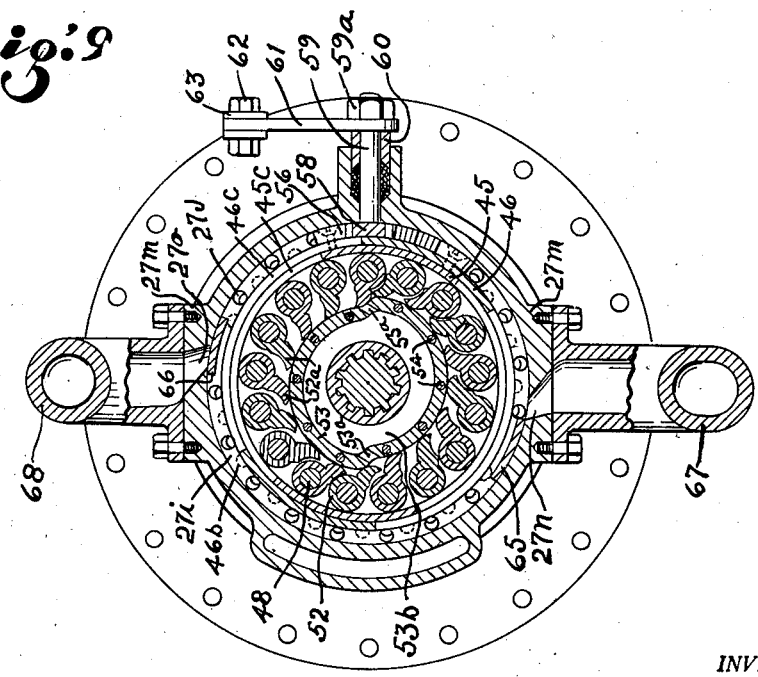
Fig. 9 is a vertical section taken substantially on line 9—9 of Fig. 2 as indicated by the arrows.

Referring to the drawings, an automotive vehicle of the tractor type is shown comprising a frame 15, a front axle 16 on which are mounted the front wheels 17, rear axle housings 18 in which are disposed axles on which are mounted the driving wheels 19. A differential mechanism for the wheels 19 and their axles, the usual type employed in tractors, is disposed in the housing between axle housings 18 and comprises a spur gear (not shown) driven by a pinion on the same axis as a driving bevelled gear 20 shown in Fig. 2. Certain steering connections of the front wheels are shown as 21 which are connected to the usual steering wheel 22. A motor 24 of the usual internal combustion type is mounted on the front of the tractor frame and said motor has a crank shaft which is connected to a fly wheel 24a shown in Fig. 2 and which forms the rotating driving element of said motor. A portion of the usual motor housing of the tractor is shown as 25. In accordance with the present invention, a ring 26 which may be a casting is provided, and this will be finished at its front end to fit and be connected to the housing 25 of the tractor motor. At its rear end ring 26 will be finished so as to be fitted to and connected to a pump housing or casting 27. As shown in Fig. 2, housing 25 is rabbeted to receive ring 26 and housing 27 is rabbeted or shouldered to receive said ring. Members 25, 26 and 27 are connected by a plurality of circumferentially spaced headed bolts 28. Housing 27 at its rear end has a flange 27f fitting against a ring 30 and being connected thereto by a plurality of circumferentially spaced headed bolts 31, said bolts being shouldered into a flange 32a or into lugs 32b of a housing 32 of a fluid operated motor or transmission device. Ring 30 encloses a casting 27a forming one end plate of pump housing 27. Said member 27a is connected to housing 27 by a plurality of circumferentially spaced headed bolts 33 and has a central hub in which is disposed a bearing 34 for the shaft 35 which constitutes the driving shaft for pump P. A plate or casting 27b forms the other end plate for housing 27 and is connected to the latter by a plurality of circumferentially spaced headed bolts 36. Plate 27b has a central hub in which is disposed a bearing 37 for shaft 35, bearings 34 and 37 being shown as of the ball bearing type. A sealing ring 38 is disposed at the outer end of bearing 37 in plate 27b and said plate is provided with a recess 27c adapted to receive packing, which recess is covered by a plate 39 secured to the end of plate 27b by screws 40 and surrounding shaft 35. Member 24a has a central hub and the end of shaft 35 is disposed in this hub and keyed thereto by a plurality of keys. Said shaft 35 has splined and secured thereto a driving member 42 which extends between bearings 34 and 37 and has a central flange with a cylindrical periphery. End plate 27b has an inner annular flange 27d forming in said plate an annular chamber 27e. End plate 27a has an inner annular flange 27g forming in said plate an annular chamber 27h. Chambers 27e and 27h communicate with a passage 27p extending longitudinally of casing 27 as shown in Fig. 2. End plates 43 of similar construction are disposed at the ends of the said pump and have flat surfaces engaging the flanges 27d and 27g, said end plates 43 having secured thereto by circumferentially spaced screws 44 a cylindrical casing 45, the heads of screws 44 being countersunk therein. A cylindrical casing 46 surrounds and fits against casing 45, the same having outwardly extending flanges 46a fitting against the cylindrical bore in housing member 27, said latter flanges and the ends of housing 45 also fit at their ends into annular recesses formed in the flanges 27d and 27g and casing 45 is held in position by dowel pins 47 extending into flanges 27d and 27g. The central flange of member 42 has secured therein studs 48. These studs have collars thereon fitting against the studs of said flange and have unthreaded portions adjacent said collars extending some distance into said flange. Pins or studs 48 extend in opposite directions from said flange and are in staggered relation at opposite sides thereof. The end plates 43 are provided with annular grooves in which are disposed rings 50. Pins or studs 48 have reduced portions extending into said rings and circumferentially spaced screws 51 extend through said rings into said studs, the heads of said screws being countersunk in said rings. The studs or pins 48 have pivotally mounted thereon vanes or blades 52 shown in Fig. 9. As shown in said figure, said vanes have projections or lugs 52a which are provided with concave recesses at one side so as to fit against the hub of the adjacent vane. Said vanes or blades have convex surfaces at the inner side of said lugs 52a which engage with the peripheral surface of a cam member 53. It will be understood that there are a series of vanes 52 at each side of the central flange of member 42 and there is a cam member 53 at each side of said central flange. Cam members 53 are respectively secured to the plates 43 by a plurality of headed screws 54 threaded into said plates and having their heads countersunk in said cams. As shown in Fig. 9, the cam 53 extends eccentrically to the hub of member 42 and shaft 35 and has opposite similar sides each substantially 180 degrees in extent. The innermost end of each of said sides is adjacent the outermost end of the other side and said cam between said ends has openings 53a therethrough which communicate with the chamber 53b within said cam which extends about the hub of member 42. As shown in Fig. 2, chamber 53b communicates at its ends with chambers 27e and 27h. It will be noted that flanges 46a form a chamber 27i between housing member 27 and the circular casing 46. Passages 27j extend from chamber 27e through flanges 27d and are adapted at times to register with passages 46b in flanges 46a and thus connect chambers 27e and 47h with chamber 27i. Cylindrical members 45 and 46 have openings 45c and 46c therethrough and casing 46 is revoluble about casing 45 to bring these openings into the desired relative positions. These ports or openings as shown in Fig. 2 are in the form of circumferentially extending comparatively narrow slots and there is one at each side of the central flange of member 42. To rotate casing 46 the same has secured thereto a curved rack 56 secured at its ends by screws 57 having their heads countersunk therein. Said rack has meshed therewith a pinion 58 secured to a shaft 59 extending through a boss 27k on housing 27 and through a packing gland 60, the same having a nut 59a illustrated as of hexagon shape. Packing can be disposed in the bore of boss 27k at the inner end of the gland 60. Shaft 59 has secured thereto beneath nut 59a an arm 61, which arm is pivotally connected at its other end by the headed and nutted bolt 62 between the forked ends of a link 63 which extends rearwardly at the top of the tractor frame and is provided with a handle 63a adapted to be grasped by the operator. Housing member 27 has bosses 27m at its upper and lower sides through which extend openings or ports 27n and 27o respectively. Said latter ports open into chamber 27i. Ports 27n and 27o can be closed or opened alternately by arcuate valves or plates 65 and 66 respectively which are movable with casing 46. Flanged conduit 67 and 68 are bolted to the bosses 27m respectively and conduit 68 is curved and extends to an inlet member or conduit 69, said members having mating flanges 68a and 69a connected by the circumferentially spaced headed and nutted bolts 70. Member 69 supplies fluid under pressure to the fluid operated motor or transmission member designated generally as TM. Conduit 67 extends to and is bolted to the housing of a fluid operated motor designated generally as SM, said conduit having a flange bolted to said housing by the circumferentially spaced headed and nutted bolts 72. The said transmission member or motor TM is substantially the same as that disclosed and claimed in applicant's copending application S. N. 376,626, filed January 31, 1941. Said motor TM has the housing member 32 already referred to and this is provided with a flange 32c at the end opposite pump P, said flange being bolted by bolts 73 to a housing or casing 74 which extends to and will be connected to the differential housing of the tractor. This member 74 can be constructed as shown to be connected to one end of motor TM and can be varied at its other end to fit on and be connected to the particular tractor to be supplied with the transmission. An end plate or casting 32d is enclosed in the member 30, the same being similar to member 27a but facing in a reverse direction. Member 32d is connected to housing member 32 by circumferentially spaced bolts 76. Member 32d has a central hub in which is carried another bearing 34 in which is journaled the rotor shaft 77 of motor TM. Another end plate 32e is provided at the end of housing 32 opposite end plate 32d and the latter is bolted to housing 32 by the circumferentially spaced bolts 78. Member 32e has a central hub in which is disposed a bearing 79 in which shaft 77 is also journaled. A sealing ring 80 is disposed at the outer side of bearing 79 about shaft 77 and member 32e is provided with a recess 32f adapted to receive packing and this recess is covered by a plate 81 bolted to the outer end of member 32e which surrounds shaft 77. Members 32d and 32e have inner annular flanges 32g and 32h respectively and said members have formed therein chambers 32i and 32j respectively. End plates 82 fit against the inner sides of flanges 32g and 32h respectively, said plates being of cylindrical form, the same being disposed in the ends of a cylindrical casing 83 which extends therebetween. Casing 83 is bolted to said plates by circumferentially spaced bolts 84 having their heads countersunk in said casing. The end members 32d and 32e have annular recesses formed therein and casing 83 extends into the inner portion of said recess and contacts said plates at its ends. Dowel pins 85 extend into the ends of casing 83. Casing 83 is surrounded by another casing 86 of cylindrical form which fits closely on casing 83 and has end flanges fitting against end plates 32d and 32e respectively. End plates 32d and 32e have passages 32p extending therethrough adjacent their sides and these passages are adapted to be brought into and out of register with passages 86a extending through the end flanges of casing 86. Casing 86 is spaced between its end flanges from casing 32 to form a chamber 32q with which the passage in member 69 communicates. Casing 86 is adapted to be oscillated and for this purpose has secured thereto a rack 88 secured by screws 89 having heads countersunk therein. A pinion 90 meshes with rack 88, which pinion is secured to a shaft 91 extending centrally through a boss 32r on housing 32. Boss 32r is bored to provide a recess about shaft 91 for receiving packing and a gland 92 fits in said bore about shaft 91 to engage said packing. Shaft 91 is provided at its outer end with a nut 93 between which a gland 92 is secured and lever 94 to the opposite ends of which are connected links 95, the same extending to a point adjacent the steering wheel 22 and the driver's position and being provided with pedals 95a. Within casing 83 and midway between end plates 82 is disposed a ring 97 secured to casing 83 by circumferentially spaced screws 98 having their heads countersunk in said casing. A bearing 99 is carried at the center of ring 97 in which shaft 77 is journaled. Ring 97 divides the chamber in casing 83 between end plates 82 into two chambers of equal size and similar mechanisms are disposed in these chambers. Rotors 101 and 102 have hubs surrounding shaft 77 and have disk-like portions cylindrical in form fitting casing 83. Rotor 101 is provided on its hub face adjacent the end of the casing with a half clutch 101a adapted to engage with and mating half clutch 100a on a clutch member 100 splined to and thus slidable on shaft 77 as shown in Fig. 7. Rotor 102 is provided with a half clutch on the face of its hub adjacent the end of the casing, the same being adapted to engage with and mating half clutch 103a on a member 103 splined to and thus slidable on shaft 77. For moving clutch member 100 the same is provided with an annular groove in which seats one end of a crank shaft 104 journaled in one end plate 82 and extending through casing 83 and a slot in casing 86 and being provided within chamber 32q with a mutilated pinion 105. Pinion 105 meshes with a rack 106 secured to the outer side of casing 86 by spaced screws having their heads countersunk therein. It will be seen that upon rotation of casing 86 rack 106 will oscillate pinion 105 and crank shaft 104 to move clutch member 102 longitudinally of shaft 77. Clutch 100 can thus be readily engaged with or disengaged from the rotor 101 and this will connect or disconnect said rotor from shaft 77. Another crank shaft 107 is journaled in the other end plate 82 and has its crank end disposed in a groove in clutch member 103. Shaft 107 is connected to a mutilated pinion 108 which meshes with a rack 109 secured to the outer side of casing 86 by screws 110 having their heads countersunk in said rack. It will be seen that rotation of casing 86 will oscillate pinion 108 thus rotating crank shaft 107 and moving clutch member 103 longitudinally to connect shaft 77 with shaft 102 or to disconnect said shaft therefrom. The disk portions or rotors 101 and 102 have secured therein adjacent the wall of casing 83 or pins or studs 112. These pins have threaded ends screwed into said disk and are provided with collars 112a engaging said disks or disk-like portions. Said pins have an unthreaded portion adjacent said collar disposed in said disk. Pins 112 at the ends of casing 83 extend to and have reduced portions disposed in rings 113 disposed in recesses in end plates 82. The pins 112 extend toward the center of casing 83 extend to and have reduced portions disposed in similar rings 113 disposed in recesses in central ring 97. Small screws 114 extend through rings 113 centrally into pins 112 having their heads countersunk in said rings. Pins 112 are thus connected to the rings 113. The pins 112 extend in opposite directions from the disk like portions of rotors 101 and 102 and are in staggered relation at opposite sides of said disk portions. The pins 112 have journaled thereon the vanes or plates 116 as shown in Figs. 3 and 4. Said vanes have projections 116a, the outer sides of which are provided with concave recesses adapted to fit around the hub of the adjacent vane. The inner sides of said projections are provided with convex surfaces and are adapted to ride on the periphery of a cam member 117 which surrounds and is spaced from the clutch members 100 and 103 and the hubs of rotors 101 and 102 respectively. Said cam members as shown in Fig. 7 are four in number and the ones at the ends of casing 83 are secured to rings 82 by circumferentially spaced bolts 118 while the ones adjacent the center of casing 83 are secured to central ring 97 by similar bolts 118. As shown in Fig. 4 the wall of cam member 117 extends in a spiral path or eccentrically to shaft 77 and said cam plate has an opening 117a at the juncture of the innermost and outermost part of its wall. This opening extends from the chamber in which the vanes 116 are disposed to a chamber 119 within cam member 117 and this chamber 119 communicates at its ends through openings in end plates 82 with the chambers 32i and 32j. The chamber 32i communicates through a passage 32y with a passage 32w extending longitudinally of member 32 at one side thereof. Chamber 32j also communicates with passage 32w through a passage 32z. A passage 30f in ring 30 connects passage 32w with passage 27m as shown in Fig. 2. It will be seen that there are two chambers 119, one at either side of central ring 97. The disk portions of members 101 and 102 have openings therethrough so that the chambers 119 in the valve members at the opposite sides thereof are in communication. The vanes 116 at one side of ring 97 namely the side at the right thereof as seen in Fig. 7, are disposed with their projections 116a extending in one direction as shown in Fig. 4 and casings 83 and 86 have circumferentially spaced openings or ports 83b and 86b respectively adapted to be brought into or out of register by rotation of casing 86. It will be seen that said ports or openings are at an angle to the radii of said casings and are directed toward the outer sides of the vanes 116. Said openings form in effect nozzles for directing fluid under pressure against said vanes. The vanes 116 at the other side of ring 97 namely the left hand side as seen in Fig. 7, are arranged to extend in a direction opposite to those at the right of the ring 97 as shown in Fig. 3. Casings 83 and 86 have the openings 83b and 86b therethrough at the left of ring 97 as seen in Fig. 4 directed oppositely to those at the right of ring 97 as shown in Fig. 3. Referring again to inlet member 69, the same is provided with a central partition 69d forming passages 69b and 69c at either side thereof. Housing 32 is provided with passages 32s and 32t communicating at their outer ends with passages 69b and 69c respectively and leading to chamber 32q. A plate 121 is disposed so as to overlie passages 32s and 32t and be moved with casing 86 to uncover one or the other of said passages as shown in Figs. 3 and 4. The ring or casing 74 is provided with an inwardly extending flange connected to the adjacent end flange of housing member 32 by the same of the circumferentially spaced bolts 73. Member 74 is provided with a central hub 74a in which is disposed a bearing 123 for shaft 77. It will be seen that bearings 34, 79 and 123 are of the ball bearing type. A bevelled pinion 124 is keyed to the end of the shaft 77 and meshes with bevelled gear 20 which forms the main or driving gear for the differential gearing of the tractor axles driving wheels 19. The motor or transmission device TM is constructed and arranged to operate by liquid under pressure from pump P and to drive gear 20 in either direction. The further operation will be later described.

The motor SM comprises the housing member 130 which is of general cylindrical form and to which conduit 67 is connected as previously described. Housing 130 has a flange at one end bolted by bolts 129 to a mating flange on casing 32. Housing 130 has an inlet opening 130a communicating with conduit 67. End plates 130b and 130c are bolted to the ends of housing 130 by circumferentially spaced bolts 131. End plate 130c has a central hub in which is secured a bearing 132 and end plate 130 has centrally secured therein a similar bearing 132, said bearings being shown as of the ball type. A shaft 133 constituting the rotor shaft of motor SM extends between and is journaled in bearings 132. A sealing ring 134 is disposed at the outer side of each of said bearings surrounding shaft 133 and end plates 130b and 130c are each provided with recesses at their ends surrounding shaft 133 and adapted to receive packing material 135. End plates 136 extend about shaft 133 and are bolted to the outer ends respectively of end plates 130b and 130c being secured by screws 137 and acting to hold packing 135 in place. End plate 130c has an inner and inwardly extending annular flange 130d. End rings 138 are provided, one engaging the inner flat surface of flange 130d and the other engaging end member 130b. Said rings have cylindrical peripheries and a casing 140 extends about said peripheries and between said rings and is connected to said rings by the circumferentially spaced screws 141 having their heads countersunk in casing 140. Pins 142 extend into the ends of casing 140 and into end member 130b and flange 130d respectively. A casing 143 surrounds and fits snugly on casing 140, the same engaging end member 130b at one end and having an outwardly extending flange engaging end plate 130c and housing 130 at its other end. It will be noted that end members 130b and 130c are provided with annular recesses in which are disposed the ends of casing 140 and 143. Said end flange of casing 143 has circumferentially spaced openings 143a therethrough which are adapted to be brought into and out of register with openings 130e in flange 130d of end member 130c. A rotor 145 is keyed to shaft 133 by a plurality of circumferentially spaced keys. Said rotor 145 has a central disk-like portion having a cylindrical periphery engaging the inner side of casing 140. Said central portion has secured therein a plurality of circumferentially spaced pins or studs 146. Said studs have ends threaded into member 145 and have collars thereon engaging the side of member 145. Said studs have a short portion adjacent said collar which is unthreaded and disposed in member 145. Pins 146 project at opposite sides of member 145 and are arranged in staggered relation at opposite sides of said central portion. Pins 146 extend to and have reduced portions disposed in rings 147 seated in annular recesses in the end plates or rings 148. Small screws 149 extend through said rings into the ends of pins 146. Pins 146 have journaled thereon vanes or plates 150. Vanes 150 have projections 150a, the outer sides of which are provided with concave surfaces adapted to first against the hub of the adjacent vane. The inner sides of said projections have convex surfaces arranged to engage the periphery of a cam member 151 which surrounds and is spaced from the hub of rotor 145. There is a cam member 151 at each side of the central disk portion of rotor 145 and said cam members are secured respectively to the end rings 138 by the circumferentially spaced bolts 152 having heads countersunk in said cam members. A chamber 153 is formed between said cam members and the hub of rotor 145. The walls and peripheries of cam members 151 are eccentric to shaft 133 and at the junction of the innermost and outermost positions have openings 151a therethrough connecting chambers 153 with the chambers containing vanes 150. As shown in Fig. 7, the central portion of rotor 145 has openings therethrough so that the chambers 153 at each side of said central portion are in communication. End member 130c has an annular chamber 130f therein and this is in communication with chamber 153 through the central opening of ring 138. Shaft 133 projects beyond end member 130b and has keyed thereto a pulley 154. Casings 140 and 143 have at each side of the disk portion of rotor 145 sets of openings or ports 140b and 143b. These openings as shown in Figs. 5 and 6, are disposed at an angle to the radii of said casings and are directed against the outer side of vanes 150. Said openings 140b and 143b are adapted to be brought into and out of register by rotation of casing 143. It will be noted that the vanes 150 at one side of the disk portion of the rotor 145 are arranged to extend in one direction as shown in Fig. 6 while said vanes at the other side of said disk portion extend in the opposite direction as shown in Fig. 5. The openings 140b and 143b are likewise arranged to extend in different directions. Casing 143 is arranged to be oscillated and for this purpose a rack 156 is secured to the outer side of said casing by screws 157 having their heads countersunk in said rack. A pinion 158 meshes with rack 156, the same being secured to a shaft 159 extending centrally through a boss 130h of housing 130, the same having a nut 160 on its outer end. An arm 161 is secured to the outer end of shaft 159 beneath nut 160, the same having pivotally secured to its other end a link 162 extending to a point adjacent the operator for convenient manipulation by the operator and having a handle 162a secured thereto. The link 161 has a portion moving between scales 163 which are provided with graduations which may be designated by numbers or letters to indicate the position of link 162. Casing 130 has a boss 130i on its lower side to which is connected by bolts 165 the conduit 68 which is also connected to the casing 27 of the pump P as shown in Fig. 9.

The casing 130 and its flange connecting the same to casing 32 is so constructed that it can also be attached to the rear end of casing 15 as shown in Fig. 10. A ring 170 is provided which will be secured to the rear end of casing 15 by the bolts 171. Ring 170 is provided with a flange 170a constructed and arranged to mate with the flange on member 130. An elbow connection 172 will be provided which will be connected to casing 130 as is conduit 67. A member 173 will be provided which will extend to and be connected to conduit 67. Another conduit 174 will replace conduit 68 and be connected to the bottom of housing 130 and will extend to and be connected to housing 27 of the pump P. The pulley 154 will be transferred with the whole assembly of casing 130 and parts thereof. The pulley 154 can thus be disposed either at the side of the tractor or at the rear thereof.

The operation of the tractor and parts above described is as follows:

The motor 24 of the tractor will be operated as usual and this being directly connected to the pump P, the latter will be driven. The pump P as well as the fluid operated motors SM and TM will be filled with the necessary fluid which can be a liquid such as oil. Shaft 35 of the pump being driven, the rotor 42 will be rotated and the liquid will be moved by the vanes 52 and forced outward through the ports 45c. The liquid will thus move from the chamber 53b within cam member 53 through the openings 53a into the annular chamber in which vanes 52 move and as stated, will be forced out through ports 45c into the chamber 27i. The fluid being forced into chamber 27i may, if openings 27j and 46b are in register, pass through said openings at either end of casing 46 and will pass into the chambers 27e and 27h. From these latter chambers as shown in Fig. 2, the fluid may again pass into valve 53 and the fluid will thus merely be circulated in the pump. If the casing 46 is rotated by means of pinion 58 and rack 56 through movement of link 63 and arm 61 to bring the openings 27j and 46b out of register, one of the openings 27n or 27o will be opened. Assuming opening 27n is open to chamber 27i as shown in Fig. 9, the fluid will pass out through said opening into conduit 67 and will be forced therethrough into the chamber in casing 130 between the inner wall of said casing and casing 143. From this chamber the fluid will pass through openings 143b and 140b which as before described, act as nozzles for directing the liquid against the vanes 150. The liquid being directed against said vanes rotor 145 is rotated and the same revolves with vanes 150 thereon, the latter riding with their convex surfaces on cam member 151. It will be seen that a seal is provided by these convex surfaces against cam 151 until the opening 151a is reached when the liquid will pass through said opening into chamber 153 and will pass therefrom through one of the rings 138 into chamber 130f and will pass therefrom through passage 32y into passage 32w and from there through passage 30b in ring 30 and through passage 27p and to passages 27e and 27h where it again passes into chamber 53b of pump P. The revolution of rotor 145 drives shaft 133 and the service pulley 154 is thus rotated for whatever service is desired. As described, the casing 143 can be oscillated by rack 156 and pinion 158 to bring the openings 143a and 130e into register. The fluid will then pass from conduit 67 into the chamber between casings 130 and 143 through openings 143a and 130e into chamber 130f and then back to the pump through passages 32y, 32w, 30b and 27p. The rotor 145 can thus be rotated with the fluid under pressure or the fluid can merely be bypassed in casing 130.

If the openings or passage 27o is uncovered by plate 66 and the passage 27n is covered by plate 65 the fluid from pump P will be forced through conduit 68 and will pass into inlet member 69 and into the passages 32s and 32t. Assuming that the passage 32t is uncovered by plate 121 as shown in Fig. 4, the fluid will pass into chamber 32q between the wall of housing 32 and casing 86. The fluid will then pass through the openings 83b and 86b if these are in register as shown in Figs. 4 and 7. These openings or passages act as nozzles and direct the fluid against the outer sides of the vanes 116. Rotor 102 is thus rotated and will be in engagement and will drive clutch member 103 thus driving shaft 77. The fluid acting against vanes 116 as stated rotates rotor 102 and said vanes form a seal against the periphery of cam member 117 until the opening 117a is reached when the liquid will pass into the chamber 119 within cam 117. The fluid will then pass longitudinally of said chamber into the chamber 32j of end member 32e. From here it will pass into passage 32w and will pass through passage 30b into passage 27p and back to the pump. Rotation of rotor 102 and clutch member 103 as stated rotates shaft 77 in one direction and differential gear 20 will be rotated to drive the tractor wheels 19. The operator by movement of links 95 can oscillate casing 86 and bring the passages 86b and 83b at the other side of ring 97 into register. This position is shown in Fig. 3 and the rotor 101 will then be driven and this will at that time be clutched to clutch member 100 and will drive shaft 77 in the direction opposite to that in which it was driven by rotor 102 and clutch member 103. It will be understood that when the operator oscillated casing 86 the pinions 106 and 108 were rotated, thus oscillating the crank shafts 104 and 107. This disconnected clutch member 103 from rotor 102 and connected clutch member 100 with rotor 101. The said oscillation of casing 86 also moved plate 121 to uncover passage 32s and cover passage 32t as shown in Fig. 3. The casing 86 can be placed in midposition where the openings 86a will be in register with openings 32p. When in this position the liquid will pass from chamber 32q through the said latter openings into passage 32j and will merely be bypassed. Neither of the rotors 101 or 102 will then be driven. The clutches on said rotors will then be only partly engaged. In changing the direction of rotation of the transmission motor it must be moved through the bypass position.

It will thus be seen that the motor or transmission mechanism TM can be driven in either direction at will and forward and reverse speeds of the tractor can thus be had. The openings 83b and 86b can be brought more or less into register as desired and the desired speed of rotation of shaft 77 can be thus directly controlled by the operator by moving the links 95. Any speed from zero to maximum speed and full power can be had in driving the tractor in either direction by movement of links 95 which are under the direct control of the operator. The motor SM can be similarly controlled and any desired speed of pulley 154 can thus be secured.

Figure 1:
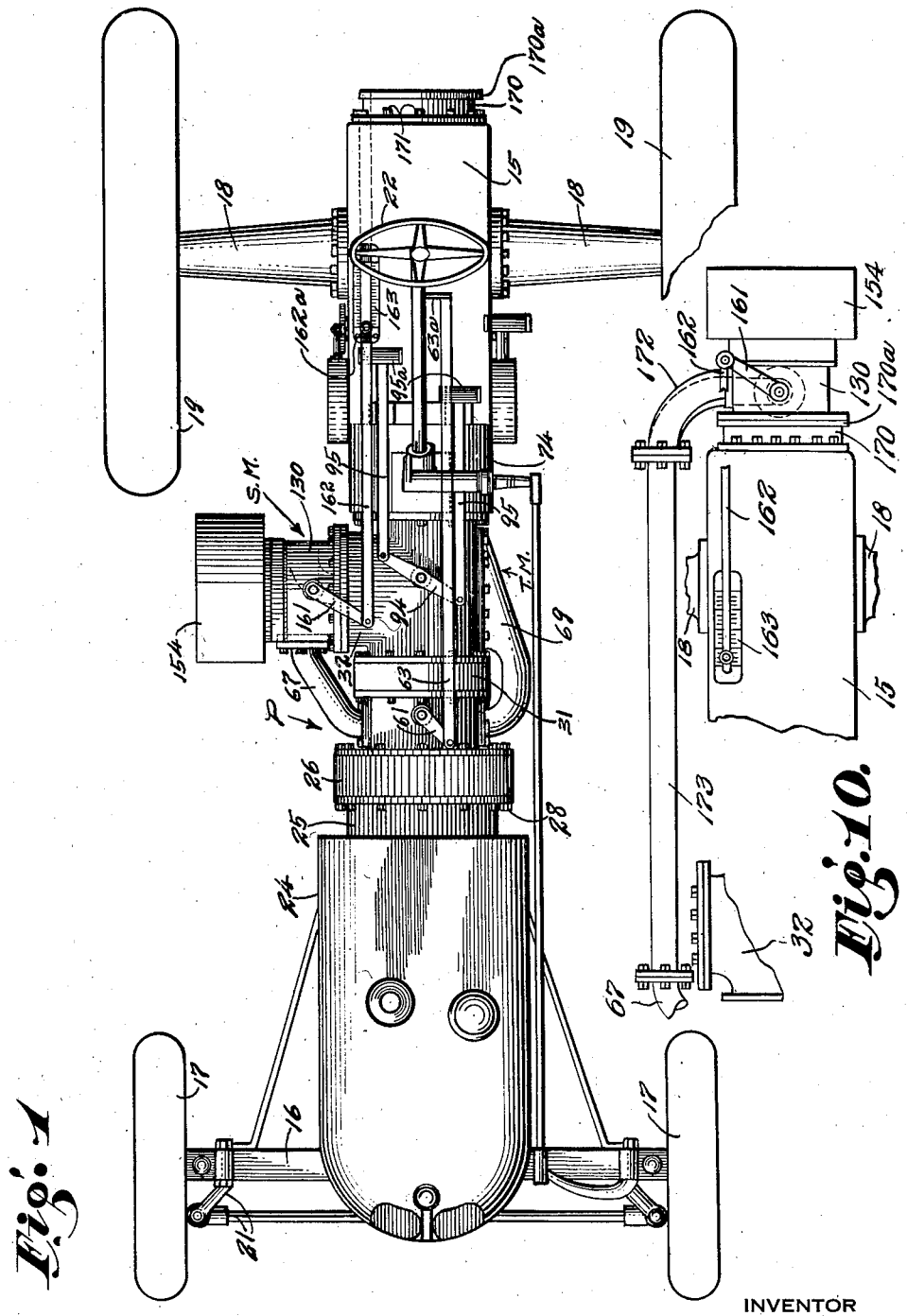
Fig. 1 is a plan view of a tractor having the invention applied thereto.

The pump is provided with two openings 53a thus giving more volume of fluid. In the service motor and transmission motor only one opening is provided in the cam of the rotor as it is desired to get more pressure area. It will be seen that the internal combustion motor of the tractor can be operated and the pump driven thereby. The fluid can be bypassed in the pump if desired so that no fluid under pressure will be supplied to the service motor or the transmission motor. The fluid under pressure can be supplied to the transmission motor and the driving of the tractor wheels and the movement of the tractor can then be controlled by either driving the shaft of the transmission motor in either direction or bypassing the fluid in the transmission motor. The full power of the internal combustion motor and pump can thus be had and any desired torque can be applied to the tractor wheels through the transmission motor. The movement of the tractor can thus be controlled with the pump being driven either by bypassing fluid in the pump or by controlling the transmission motor. The service motor can likewise be either driven with the fluid from the pump or the fluid can be bypassed therein. The internal combustion motor can thus be speeded as desired and only the desired speed given to the tractor wheels or to the service pulley. The differential gearing for the wheels can thus be moved at quite a low speed while the internal combustion motor is running at full speed. With the service motor attached to the rear end of the tractor as indicated in Fig. 1, a universal joint could be substituted for pulley 154 and coupled to a harvester for driving the latter. The harvester could thus be operated by the transmission motor and progressed or drawn along the ground at the same time by the tractor. At this time some fluid under pressure would be supplied to both the service motor and the transmission motor.

From the above description it will be seen that I have provided a novel and extremely efficient combination for a tractor. The structure can be made very compact and as stated, can be applied either to new tractors or to tractors which have been used. A great flexibility is given to the control of the tractor and results can be secured which have heretofore been impossible. It will be obvious that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A tractor with fluid drive and transmission having a frame, driving wheels, a differential gearing for driving said wheels, an internal combustion motor mounted at the forward part of said frame comprising a rotating driving element, a pump having a drive shaft directly connected to said element, a fluid operated motor driven by fluid under pressure from said pump, a conduit connecting said pump and fluid operated motor for supplying fluid under pressure to said fluid operated motor, said motor having portions to which liquid is delivered to rotate said motor in opposite directions respectively, a second conduit connecting said pump and motor for returning fluid to said pump, a shaft driven by said fluid operated motor, means for connecting and disconnecting each of said portions of said motor to and from said shaft respectively and means connecting said shaft and said differential gearing.

2. A tractor with fluid drive and transmission having a frame, driving wheels, a differential gearing for driving said wheels, an internal combustion motor mounted at the forward part of said frame comprising a rotating driving element, a pump directly connected to said element, a fluid operated motor driven by fluid under pressure from said pump, a conduit connecting said pump and fluid operated motor for supplying fluid under pressure to said motor, means for directing fluid to said motor for driving the same in opposite directions, a second conduit connecting said pump and motor for returning fluid to said pump, said fluid operated motor being located between said pump and said differential gearing, a shaft connected to said differential gearing and clutches for connecting and disconnecting said shaft and motor for driving said shaft in opposite directions respectively.

3. A tractor with fluid drive and transmission having a frame, driving wheels, a differential gearing for said wheels, an internal combustion motor mounted at the forward part of said frame comprising a rotating driving element, a pump having a driving shaft connected to said driving element, a bearing for said shaft at the end of said pump adjacent said element, a bearing for said shaft at the other end of said pump, a fluid operated motor adjacent said pump having a rotor and a driving shaft connected thereto, a bearing adjacent said pump for said last mentioned driving shaft, a bearing at the other end of said fluid operated motor for said last mentioned driving shaft, said driving shaft with said pump and fluid operated motor being co-axial, a casting between said fluid operated motor and differential gearing, a bearing for said second mentioned driving shaft in said casting and a pinion secured to said last mentioned driving shaft adjacent said last mentioned bearing connected to said differential gearing.

4. A tractor with fluid drive and transmission having a frame, driving wheels, an internal combustion motor mounted on said frame and a differential gearing for driving said wheels, a pump connected to said motor, a fluid operated motor driven by fluid under pressure from said pump, a conduit connecting said pump and fluid operated motor for supplying fluid under pressure to said motor, a conduit connecting said pump and fluid operated motor for returning fluid to said pump, a second fluid operated motor driven by fluid under pressure from said pump, a conduit connecting said pump and second fluid operated motor for supplying fluid under pressure thereto, a conduit connecting said second fluid operated motor and pump for returning fluid to said pump, a service pulley driven by said second fluid operated motor, a shaft driven by said first fluid operated motor connected to said differential gearing and means for directing fluid from said pump to either of said fluid operated motors.

5. A tractor with fluid drive and transmission having a frame, driving wheels, a differential gearing for driving said wheels and an internal combustion motor mounted at the forward part of said frame having in combination, a casing for said motor, a pump having a housing, an adapter member between said motor casing and housing, means for securing said motor casing, adapter member and housing rigidly together, a fluid operated transmission motor for driving said differential gearing having a housing, means rigidly connecting said latter housing and said pump housings, a differential housing and an adapter member between and rigidly secured to said latter housing and said transmission motor housing.

6. In a tractor with fluid drive and transmission, said tractor having a frame, driving wheels, a differential gearing for driving said wheels, an internal combustion motor mounted at the forward part of said frame, the combination of a fluid pump driven by said motor having a housing with inlet chamber, a passage in said housing at one side thereof with which said chamber communicates, a fluid operated transmission motor connected to said pump to be driven by fluid under pressure therefrom having a housing with outlet chambers at its ends and a discharge passage at one side thereof extending longitudinally thereof, said last mentioned passage being connected to said first mentioned passage of said pump housing, a shaft driven by said transmission motor and a gear on said shaft for driving said differential gearing.

7. In a tractor with fluid drive and transmission, said tractor having a frame, driving wheels, a differential gearing for driving said wheels, an internal combustion motor mounted at the forward part of said frame, the combination of a fluid pump driven by said motor, a fluid operated transmission motor, an inlet conduit connecting said pump and transmission motor, a return conduit connecting said pump and transmission motor, a fluid operated service motor, an inlet conduit connecting said pump and said service motor, a return passage connecting said service motor and pump, means for directing fluid from said pump to either of said motors including a member located at one side of said pump and transmission motor and extending to the driver's position, means for changing the rotation of said transmission motor located at the same side of said service motor and extending to the operator's position and a driving connection between said transmission motor and said differential gearing.

8. In a tractor with fluid drive and transmission, said tractor having a frame, driving wheels, a differential gearing for driving said wheels, an internal combustion motor mounted at the forward part of said frame, the combination of a fluid pump driven by said motor, said pump having a housing, a member between said motor and housing, means rigidly connecting said member and said motor and housing together, a fluid operated transmission motor having a housing, means rigidly connecting said pump housing and said housing of said transmission motor, a service motor having a housing, means rigidly connecting said latter housing to one side of said housing of said transmission motor, an inlet conduit extending from said pump to said transmission motor and being rigidly connected to said pump and transmission motor, an inlet conduit for said service motor extending from said pump to said service motor and being rigidly connected to said pump housing and service motor housing, said service motor housing, transmission motor housing and pump housing having connecting passages at one side thereof forming a return passage to said pump, a service pulley driven by said service motor and a shaft driven by said transmission motor connected to said differential gearing for driving the same.

9. In a tractor with fluid drive and transmission, said tractor having a frame, driving wheels, a differential gearing for driving said wheels, an internal combustion motor mounted at the forward part of said frame, the combination of a fluid pump driven by said motor, said pump having a housing with outlet openings at opposite sides thereof, a fluid operated transmission motor having a housing rigidly connected to said pump housing, a conduit rigidly connected to said pump housing and to said transmission motor housing, the same communicating with one of said outlet openings of said pump and forming an inlet conduit for said transmission motor, a fluid operated service motor having a housing rigidly connected to said transmission motor housing, a conduit rigidly connected to said pump housing and to the housing of said service motor, forming an inlet conduit therefor and communicating with the other outlet opening of said pump, said housings having therein communicating passages for returning fluid to said pump from said service motor and transmission motor, a shaft driven by said transmission motor and geared to said differential gearing and a service pulley driven by said service motor.

10. In a tractor with fluid drive and transmission, said tractor having a frame, driving wheels, a differential gearing for driving said wheels and an internal combustion motor mounted at the forward part of said frame, the combination of a fluid pump driven by said motor, a fluid operated transmission motor driven by fluid under pressure from said pump, a service motor driven by fluid under pressure from said pump, said pump having an oscillatable member for directing fluid to either said service motor or transmission motor and means for oscillating said member including a member extending to the driver's position.

11. The structure set forth in claim 10, said transmission motor having a revoluble casing for changing the direction of rotation thereof, and means for oscillating said member to change the direction of rotation including a member extending to the driver's position.

12. A tractor with fluid drive and transmission, said tractor having a frame, driving wheels, a differential gearing for driving said wheels and an internal combustion motor mounted on said frame, the combination of a fluid pump driven by said motor, a fluid operated transmission motor having a driving shaft and a plurality of rotors, means for directing said fluid for rotating said rotors in opposite directions respectively and means for connecting and disconnecting said rotors respectively to said shaft for rotating the same in opposite directions and a gear on said shaft for driving said differential gearing for giving forward and rearward speeds to said tractor.

13. A tractor with fluid drive and transmission, said tractor having a frame, driving wheels, a differential gearing for driving said wheels and an internal combustion motor mounted on said frame, the combination of a fluid pump having a driving shaft directly connected to and driven by said motor and a fluid operated transmission device having a plurality of rotors driven by fluid under pressure from said pump, means for directing said fluid to drive said rotors in opposite directions, a shaft for driving said differential gearing and means for connecting and disconnecting said rotors respectively to and from said shaft, said shafts being in axial alignment.

14. In a tractor with fluid drive and transmission, said tractor having a frame, driving wheels, a differential gearing for driving said wheels and an internal combustion motor mounted at the forward part of said frame, the combination of a fluid pump driven by said motor, a fluid operated transmission motor having a shaft geared to said differential gearing for driving the same, a fluid operated service motor, a service pulley driven by said service motor, a member for controlling said pump movable to positions respectively to supply fluid to said transmission motor, to supply fluid to said service motor and to shut off supply of fluid to both of said motors and bypass said fluid within said pump and means for moving said member to either of said three positions including a member extending to a point adjacent the operator's position to be operated by the driver of said tractor.

15. In a tractor with fluid drive and transmission, said tractor having a frame, driving wheels, a differential gearing for driving said wheels, and an internal combustion motor mounted at the forward part of said frame, the combination of a fluid pump driven by said motor, a fluid operated transmission motor having a driving shaft connected to said differential gearing, a member movable to positions to shut off supply of fluid from said pump to said transmission motor and to supply fluid thereto, a member of movable to positions to operate said transmission motor to rotate said shaft in one direction, and to operate said transmission motor to operate said shaft in the opposite direction and to bypass fluid in said transmission motor without rotating said shaft.

16. In a tractor with fluid drive and transmission, said tractor having a frame, driving wheels, a differential gearing for driving said wheels and an internal combustion motor mounted at the forward part of said frame, the combination of a fluid pump driven by said motor, a fluid operated transmission motor, a fluid operated service motor, a pulley driven by said service motor, means for supplying fluid under pressure from said pump to either said transmission motor or said service motor or for bypassing fluid within said pump, means for driving said service motor with fluid supplied under pressure from said pump or for bypassing said fluid within said service motor and means for driving said transmission motor with fluid under pressure supplied from said pump or for bypassing said fluid within said transmission motor.

17. In a tractor having a frame, driving wheels, a differential gearing for driving said wheels, and an internal combustion motor mounted at the forward part of said frame, the combination of a fluid pump driven by said motor, a fluid operated transmission motor having a shaft adapted to be connected to said differential gearing and having a frame with an annular flange at one side thereof, means for supplying fluid from said pump to said motor, a member at the rear end of said first mentioned frame having an annular flange at its rear end, a fluid operated service motor having a pulley driven thereby, said service motor being constructed and arranged to be connected to either of said flanges and means for supplying fluid to said service motor from said pump.

18. In a tractor having a frame, rear driving wheels, a differential gearing for driving said wheels and an internal combustion motor mounted at the forward part of said frame, the combination of a fluid pump adjacent and driven by said motor, a fluid operated transmisison motor having a shaft adapted to be connected to said differential gearing, means for supplying fluid from said pump to said motor, a fluid operated service motor, a pulley driven by said service motor, means for supplying fluid under pressure from said pump to either said transmission motor or said service motor, control means for controlling the speed and direction of rotation of said transmission motor, control means for controlling the speed of said service motor and actuating means for said control means extending to adjacent the operator's position for convenient manipulation by the operator.

JOSEPH O. HAMREN.